(12) United States Patent
Laux et al.

(10) Patent No.: US 11,772,456 B2
(45) Date of Patent: Oct. 3, 2023

(54) AIR CONDITIONING SYSTEM

(71) Applicants: Holger Laux, Dietingen (DE);
Thorsten Moellert, Stuttgart (DE);
Matthias Schall, Ostfildern (DE)

(72) Inventors: Holger Laux, Dietingen (DE);
Thorsten Moellert, Stuttgart (DE);
Matthias Schall, Ostfildern (DE)

(73) Assignee: Mahle International GmbH

( * ) Notice: Subject to any disclaimer, the term of this patent is extended or adjusted under 35 U.S.C. 154(b) by 259 days.

(21) Appl. No.: 17/128,000

(22) Filed: Dec. 18, 2020

(65) Prior Publication Data

US 2021/0188044 A1 Jun. 24, 2021

(51) Int. Cl.
*B60H 1/22* (2006.01)
*B60H 1/00* (2006.01)

(52) U.S. Cl.
CPC ....... *B60H 1/2225* (2013.01); *B60H 1/00028* (2013.01); *B60H 1/00564* (2013.01); *B60H 2001/00128* (2013.01)

(58) Field of Classification Search
CPC .............. B60H 1/2225; B60H 1/00028; B60H 1/00564; B60H 2001/00128
USPC ........................................................ 454/159
See application file for complete search history.

(56) References Cited

U.S. PATENT DOCUMENTS

| | | | | |
|---|---|---|---|---|
| 5,062,473 A | * | 11/1991 | Ostrand | B60H 1/00692 237/12.3 A |
| 5,279,459 A | | 1/1994 | Single, II | |
| 2004/0074244 A1 | | 4/2004 | Ichishi et al. | |

FOREIGN PATENT DOCUMENTS

| | | | | |
|---|---|---|---|---|
| DE | 35 32 463 A1 | | 3/1987 | |
| DE | 19729899 C1 | * | 10/1998 | ......... B60H 1/00064 |
| DE | 19729899 C1 | | 10/1998 | |
| DE | 10055670 A1 | | 5/2002 | |
| DE | 10 2011 119 289 A1 | | 5/2013 | |
| DE | 102011119289 A1 | * | 5/2013 | ........... B60H 1/2225 |
| DE | 10 2014 215 235 A1 | | 2/2016 | |
| EP | 1 439 738 A2 | | 7/2004 | |
| EP | 2 088 011 A1 | | 8/2009 | |
| EP | 2 145 784 A2 | | 1/2010 | |

OTHER PUBLICATIONS

German Search Report dated Dec. 1, 2020 related to corresponding German Patent Application No. 10 2019 220 154.7.
English abstract for DE-10 2014 215 235.
English abstract for EP-2 088 011.

(Continued)

*Primary Examiner* — Allen R. B. Schult
(74) *Attorney, Agent, or Firm* — Fishman Stewart PLLC

(57) ABSTRACT

An air-conditioning system for air-conditioning a vehicle interior is disclosed. The air-conditioning system includes a blower for generating an air flow, a heating device for heating the air flow, and a ducting system that divides the air flow downstream of the heating device over at least two part air flows and supplies the at least two part air flows via associated ducts to associated air outlets, through which the part air flows exit into the vehicle interior. The heating device includes at least two separate regions each with at least one electric heating element that is separately controllable via a control device. The at least two separate regions are each permanently assigned one of the associated ducts of the ducting system.

20 Claims, 1 Drawing Sheet

(56) References Cited

OTHER PUBLICATIONS

English abstract for EP-2 145 784.
English abstract for EP-1 439 738.

* cited by examiner

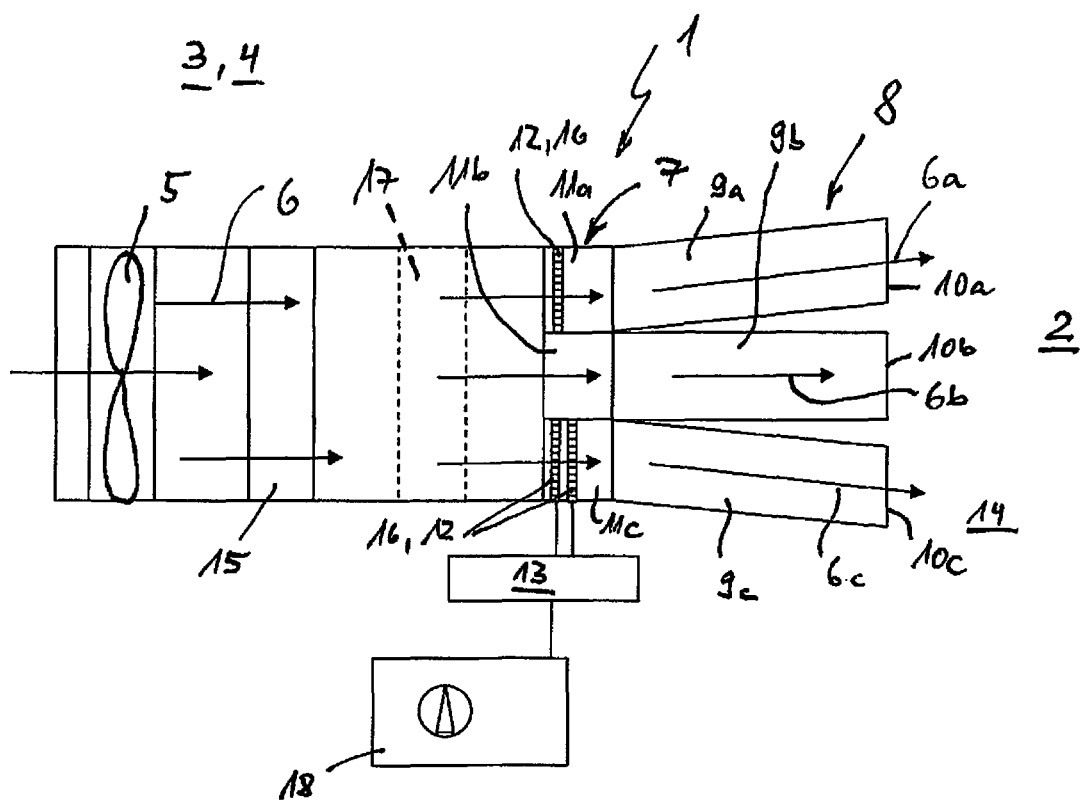

AIR CONDITIONING SYSTEM

CROSS-REFERENCE TO RELATED APPLICATION

This application claims priority to German Application No. DE 10 2019 220 154.7 filed on Dec. 19, 2019, the contents of which are hereby incorporated by reference in its entirety.

TECHNICAL FIELD

The present invention relates to an air-conditioning system for air-conditioning a vehicle interior, preferentially of a motor vehicle. The invention additionally relates to a motor vehicle having such an air-conditioning system and to a method for operating such an air-conditioning system.

BACKGROUND

From DE 10 2014 215 235 A1 a generic air-conditioning system having a blower for generating an airflow and having at least one heating device that can be flowed through by the air flow for heating the air flow is known. In addition, the air-conditioning comprises at least one cooling device that can be flowed through by the air flow for cooling the air flow and a ducting system, which during the operation of the air-conditioning system divides the air flow over multiple part flows and supplies these to multiple air outlets via multiple ducts. In order to be able to generate an increased air-conditioning comfort for vehicle occupants at least one electric additional temperature device for temperature controlling the part air flow is provided in at least one duct upstream of an air outlet.

From EP 2 088 011 A1 a housing arrangement for a vehicle air-conditioning system having an air-conduction housing is known, wherein in the distributor housing region a plurality of outlets for connecting the air ducts into the front and back region of the vehicle are provided. Here, the distributor housing region is formed by a split distributor housing and various connecting parts, wherein in an opening in the distributor housing at least one flap for regulating an air outlet opening to the back region and/or front region is integrated.

From EP 2 145 784 A2 a motor vehicle air-conditioning system having multiple climate zones is known, which comprises at least one heating device, which is arranged in the flow path of an air flow and at least one separating wall, which separates a first climate zone and a second climate zone. The at least one separating wall comprises a pressure equalisation opening which provides a part flow path for a part air flow of the main air flow. The production and the operation of the motor vehicle air-conditioning system are however comparatively expensive.

From EP 1 439 738 A2 a heating device having PTC elements are known, which are attached to a support device, wherein individual or groups of PTC elements attached to the support device are activatable separately from one another. By way of this, a sensitive control of a heat supply to the air flow to be heated is to be made possible.

In order to render the thermal comfort in a motor vehicle individualisable, there is the possibility for example of adjusting the temperature of an air outlet of a heating and air-conditioning device independently of other outlets warmer or colder, as a result of which a layering in the vehicle changes as well. Here, layering refers to a defined temperature differential between two or multiple air outlets of the air-conditioning system. A change of the temperature at one or more such air outlets is usually realised today by a targeted admixing of cold or warm air, wherein for warming the air in particular waste heat from a vehicle radiator, i.e. the hot cooling water of the same, is used. Electric auxiliary heaters and/or auxiliary heaters on the refrigerant side (heat pumps) can also be used for this purpose.

For the admixing of cold or warm air, warm air flaps in front of a heating device or a heating heat exchanger or layering flaps after the heating heat exchanger are employed and thus a warm air quantity for example in a foot well of the motor vehicle regulated independently.

Disadvantageous with the air-conditioning systems known from the prior art however is that these require additional components, namely flaps for individually air-conditioning specific regions, for example of a foot well, which for the independent activation each in turn require own actuators, as a result of which the production costs and the complexity of such air-conditioning systems increase significantly.

SUMMARY

The present invention therefore deals with the problem of stating an improved or at least an alternative embodiment for an air-conditioning system of the generic type which overcomes the disadvantages known from the prior art.

According to the invention, this problem is solved through the subject of the independent claim(s). Advantageous embodiments are subject of the dependent claims.

The present invention is based on the general idea of no longer of bringing about a locally individual heating of a vehicle interior of a motor vehicle through an elaborately controllable flap system and admixing of warm air, but by providing a heating device having separate regions in particular with separate temperature zones each with at least one electric heating element assigned to a respective region, which is individually controllable. In addition, at least one of these regions is permanently assigned a separate duct of a ducting system, which via a likewise assigned air outlet leads into a certain region of the vehicle interior. By way of this, an elaborately designed and complex control that has been necessary to date is no longer required, in particular an admixing of warm air via flaps, since for a local heating merely a heating element associated with the associated air outlet in the heating device has to be energised. The air-conditioning system according to the invention for air-conditioning a vehicle interior, in particular for air-conditioning a motor vehicle, possesses a blower for generating an air flow and at least one heating device through which the air flow can flow for heating the air flow. Likewise provided is a ducting system which during the operation of the air-conditioning system divides the air flow downstream of the heating device over at least two part flows and supplies these via associated ducts to multiple air outlets, through which the part air flows exit into the vehicle interior. According to the invention, the heating device now possesses at least two separate regions each having at least one electric heating element, wherein each heating element is separately controllable and thereby also separately activatable and deactivatable. Here, the at least two regions are each permanently assigned a duct of the ducting system, so that such a duct on the inlet side extends from the associated region of the heating device with the respective associated electric heating element as far as to the associated air outlet on the outlet side. When the air outlet is arranged for example in a foot well of the vehicle interior, the same can be separately heated with the air-conditioning system according to the invention in that the specific electric heating element in the heating device is activated, which is arranged in the region of the heating device located upstream of the duct leading into the foot well. With the air-conditioning system according to the invention it is thus possible to completely do without flap systems that are expensive regarding manufacture and control and were required up to now, as a result of which the air-conditioning system according to the invention cannot only become simpler in terms of design but also be constructed significantly more cost-effectively. In particular, it is not only the flaps that were required up to now but also the actuators that were required up to now for the respective actuation of the flaps that were required up to now that are no longer required in the air-conditioning system according to the invention, as a result of which the costs can be lowered once again. Thus, a desired temperature layering in the vehicle interior can be comparatively easily and cost-effectively achieved with the air-conditioning system according to the invention.

In an advantageous further development of the solution according to the invention at least one cooling device for cooling the air flow through which the air flow can flow is provided. Such a cooling device can be arranged for example upstream of the heating device and cause a cooling of the air flow and thus a cooling of the vehicle interior. The air flow flowing through the cooling device can flow through the heating device thereafter, which for cooling the vehicle interior is switched off. When however for example a foot well of the vehicle interior is to be less cool, the respective electric heating element arranged upstream of the duct leading into the foot well can be activated in the heating device, as a result of which the air flow entering the foot well is at least slightly heated and by way of this a desired temperature layering made possible.

Practically, at least one duct leads into a foot well of the vehicle interior, wherein this duct is connected upstream to a region of the heating device and downstream to an air outlet arranged in the foot well. By way of such an air-conditioning system having a separate duct for the foot well, which via an associated electric heating element causes a heating of the air flow flowing through the duct into the foot well, a rapid, individual heating of the foot well that is independent of the remaining air-conditioning of the passenger compartment can be carried out, which is perceived pleasant by the vehicle occupants and thereby represents a significant increase of comfort.

Practically, at least one electric heating element is formed as PTC heating element. By means of such a PTC heating element it is possible to individually heat the respective region of the heating device electrically and by way of this make possible an individual heating of local regions in the passenger compartment. Here, PTC heating elements can be comparatively easily controlled as a result of which an extremely fine temperature layering in the passenger compartment can be made possible. In addition to this, such PTC heating elements can be produced cost-effectively and in almost any shape, as a result of which a comparatively easy adaptation to installation space-specific requirement is possible. Such PTC heating elements make possible in particular also a local heating in electrically operated motor vehicles, in which a heating of an air flow by means of a coolant heated by an internal combustion engine no longer applies.

In a further advantageous embodiment of the solution according to the invention a heat exchanger is provided, which causes a basic temperature-control of the air flow while the respective electric heating element represents an additional heater. Such a heat exchanger can be for example a radiator, which is arranged upstream of the heating device or forms a part of the same. By means of such a heat exchanger a basic heating of the air flow without additional electric energy can thus be achieved in particular in a motor vehicle driven by an internal combustion engine while an additional heating beyond the basic heating can be individually taken over by the respective electric heating element in the heating device. This offers the major advantage that for a rapid and/or intensive heating for example of a foot well of the passenger compartment a basic heat can already be made available by the heat exchanger, which then merely has to be additionally increased by the associated electric heating element. By way of this, the heat emitted by the internal combustion engine can be utilised and an energy consumption, in particular in the region of the electric heating element, significantly lowered.

In a further advantageous embodiment of the solution according to the invention, at least one region in the heating device extends over an entire width or height of the heating device. By way of this it is possible to provide PTC heating elements arranged string-wise, which are usually installed vertically or horizontally (based on the installation state of the heating device). Here it is obviously also conceivable that each region is not only assigned a PTC heating element but multiple PTC heating elements, which are controllable simultaneously from a control device, as a result of which a reaction speed to temperature requests previously set via a setting device can be significantly increased. The segmenting of the heating device into individual regions to be heated by way of the respective associated electric heating elements can be individually adapted so that for example merely a corner region of the heating device is separated and connected to an associated duct downstream, wherein in this corner region at least one associated and individually controllable electric heating element is arranged. This would be conceivable for example for the instance that merely an individual heating of a foot well of the vehicle interior is desired, so that in this case the duct leads to an air outlet in the foot well of the passenger compartment.

Practically, an adjusting device connected to the control device is provided, via which a heating output of at least one electric heating element and an air mass flow to a certain air outlet are adjustable. When thus a driver of the motor vehicle for example desires a more intensive heating of the foot well, this can be entered via the adjusting device, namely through an increased heating output of the electric heating element, which is connected upstream of the duct leading to the foot well. At the same time, a blower output and thus the air mass flow can also be adjusted via the adjusting device, which flows out into the foot well of the motor vehicle by way of the previously described electric heating element and the duct. With such an adjusting device for such an air-conditioning system, the comfort for vehicle occupants can be significantly increased. Here it is obviously clear that not only ducts leading into the foot well but also other ducts, for example into a rear foot well or a side door can be suitably configured and equipped with an associated electric heating element and region in the heating device.

Furthermore, the present invention is based on the general idea of equipping a motor vehicle, in an electric vehicle or a hybrid vehicle, with an air-conditioning system described before. In particular in the case of electric motor-driven vehicles, a radiator for cooling an internal combustion engine is entirely absent, so that in this case an individual heating of different locations in the passenger compartment with the air-conditioning system according to the invention is possible without problem. For this purpose, the respective electric heating elements, in particular PTC heating elements, are connected to a vehicle battery for the energy supply.

Further important features and advantages of the invention are obtained from the subclaims, from the drawing and from the associated FIGURE description by way of the drawing.

It is to be understood that the features mentioned above and still to be explained in the following cannot only be used in the respective combination stated but also in other combinations or by themselves without leaving the scope of the present invention.

A preferred exemplary embodiment of the invention is shown in the drawing and is explained in more detail in the following description.

BRIEF DESCRIPTION OF THE DRAWING

The only FIGURE shows an air-conditioning system according to the invention for air-conditioning a vehicle interior.

DETAILED DESCRIPTION

According to the FIGURE, an air-conditioning system 1 according to the invention for air-conditioning a vehicle interior 2, in particular for air-conditioning a vehicle interior 2 of an electric vehicle 3 or of a hybrid vehicle 4 or generally of a motor vehicle, comprises a blower 5 for generating an air flow 6 and at least one heating device 7 through which the air flow 6 can flow for heating the air flow 6. Likewise provided is a ducting system 8, which during the operation of the air-conditioning system 1 divides the air flow 6 downstream of the heating device 7 into at least two part air flows, according to the FIGURE, into three part air flows 6a, 6b and 6c and supplies these via associated ducts 9a, 9b and 9c of the ducting system 8 to a respectively associated air outlet 10a, 10b or 10c, through which the part air flows 6a, 6b and 6c can enter the vehicle interior 2. According to the invention, the heating device 7 is now divided into at least two, according to the FIGURE, into three regions 11a, 11b and 11c each with at least one electric heating element 12, wherein each heating element 12 is individually and separately controllable via a control device 13. Here, each region 11a, 11b and 11c of the heating device 7 is permanently assigned a duct 9a, 9b and 9c of the ducting system 8 each, so that an air flow 6 flowing for example through the region 11c of the heating device 7 enters the duct 9c and there, as air flow 6c, enters the passenger compartment 2, for example into a foot well 14, via the air outlet 10c.

By dividing the heating device 7 according to the invention into differently and individually heatable regions 11a, 11b and 11c it is possible to heat individual regions of the passenger compartment 2, such as for example a foot well 14, individually and also independently of other regions of the passenger compartment 2, as a result of which a substantial increase of comfort for a user can be created. In particular it is also possible with the air-conditioning system 1 according to the invention to do without flaps and associated actuators that were required up to now, which were required for an individual heating of local regions in the passenger compartment 2, as a result of which the air-conditioning system 1 according to the invention and thus also the motor vehicle according to the invention, in particular the electric vehicle 3 or hybrid vehicle 4, can be configured with a simpler design and more cost-effectively.

As indicated in the FIGURE, a different number of electric heating elements 12 can also be arranged in different regions 11a, 11 b and 11c of the heating device 7, as a result of which an individual and in particular also accelerated heating of the air flow 6 flowing through the respective region 11a, 11b or 11c is possible. In the shown example, two electric heating elements 12 are arranged for example in the region 11c of the heating device 7, which in the activated state make possible a significantly faster heating of the air flow 6 and because of this also a significantly faster heating of the air flow 6c exiting into the foot well 14. With the air-conditioning system 1 according to the invention, a temperature layering in the vehicle interior 2 can also be configured with a simpler design and more cost-effectively.

Practically, at least one cooling device 15 through which the air flow 6 can flow for cooling the air flow 6 can be provided. With the air-conditioning system 1 according to the invention it is thus possible to cool the vehicle interior 2 for example in summer, but not cool the foot well 14 quite so intensively as the regions arranged above the same, for the purpose of which for example the air flow 6 cooled by the cooling device 15 is at least slightly heated in the region 11c of the heating device 7 and because of this is expelled as, compared with the air flows 6a and 6b, warmer air flow 6 via the air outlet 10c leading into the foot well 14.

Practically, at least one electric heating element 12 is designed as PTC heating element 16. Such PTC heating elements 16 make possible a cost-effective, effective and rapid heating of an air flow 6 flowing about or through these heating elements 16, which is a major advantage in particular when used in purely electric motor-operated motor vehicles 3.

In order to be able to effect a basic temperature control of the air flow 6, a heat exchanger 17 can be additionally provided, so that the respective electric heating element 12 then merely has to assume an auxiliary heating function. Such a heat exchanger 17 can be for example a coolant radiator for an internal combustion engine in a conventionally operated motor vehicle or in a hybrid vehicle 4. When such a heat exchanger 17 is incorporated in the air-conditioning system 1, the energy consumption of the electric heating elements 12 can be reduced since a basic heat supply is already supplied for example via the heat exchanger 17.

However, with the air-conditioning system 1 according to the invention it is also possible with switched-off internal combustion engine and thus cold heat exchanger 17, to bring about a zone-individual heating of the vehicle interior 2 by activating the electric heating elements 12. In this case it is also conceivable to generally design the heating device 7 only as auxiliary heater, so that a region 11b of the heating device 7 cannot comprise any electric heating element 12 at all and merely an air flow 6 heated by the heat exchanger 7 flows via region. For this reason, the heating element 12 in the region 11b is merely shown drawn with dashed lines. Obviously, nozzles formed in the known manner can still be arranged at the air outlets 10a, 10b, 10c, which make possible both a steering of the part air flow 6a, 6b or 6c and also a regulation of the air mass flow.

The at least one region 11a, 11b and 11c can extend in the heating device 7 over an entire width or height of the heating device 7, wherein obviously merely individual regions, such as for example corner regions, are also conceivable.

As is further evident from the FIGURE, an adjusting 18 connected to the control device 13 is provided, via which a temperature and an air mass flow at a certain air outlet 10a, 10*b* and 10*c* are adjustable. When for example by way of the adjusting device 18 a more intensive heating of the foot well 14 is adjusted, the electric heating elements 12 in the region 11*c* of the heating device 7 shown in the FIGURE are suitably controlled and energised via the control device 13.

With the air-conditioning system 1 according to the invention, a layering that is significantly simpler in design compared with previous systems and local heating of individual regions in a vehicle interior 2 can be brought about, wherein in particular flaps and associated actuators required up to now can be done without.

The invention claimed is:

1. An air-conditioning system for air-conditioning a vehicle interior, comprising:
    a blower for generating an air flow,
    at least one heating device through which the air flow can flow for heating the air flow,
    a ducting system that divides the air flow downstream of the at least one heating device over at least two part air flows and supplies the at least two part air flows via associated ducts to associated air outlets, through which the part air flows exit into the vehicle interior,
    wherein the at least one heating device comprises at least two separate regions each with at least one electric heating element, wherein each electric heating element is separately controllable via a controller,
    wherein each of the at least two separate regions is permanently assigned one of the associated ducts of the ducting system, and
    wherein the ducting system is without a flap downstream of the blower with respect to the air flow.

2. The air-conditioning system according to claim 1, further comprising at least one cooler through which the air flow can flow for cooling the air flow.

3. The air-conditioning system according to claim 1, wherein at least one of the associated ducts leads into a foot well of the vehicle interior.

4. The air-conditioning system according to claim 1, wherein the at least one electric heating element of the at least two separate regions is a PTC heating element.

5. The air-conditioning system according to claim 1, further comprising a heat exchanger that brings about a main temperature control of the air flow, wherein the at least one electric heating element of the at least two separate regions forms an auxiliary heater.

6. The air-conditioning system according to claim 1, wherein at least one of the at least two separate regions in the at least one heating device extends over an entire width or height of the at least one heating device.

7. The air-conditioning system according to claim 1, further comprising an adjuster connected to the control device, the adjuster structured and arranged to adjust a temperature and an air mass flow at a certain air outlet.

8. The air-conditioning system according to claim 2, wherein at least one of the associated ducts leads into a foot well of the vehicle interior.

9. The air-conditioning system according to claim 8, wherein the at least one electric heating element of the at least two separate regions is a PTC heating element.

10. The air-conditioning system according to claim 9, further comprising a heat exchanger that brings about a main temperature control of the air flow, wherein the at least one electric heating element of the at least two separate regions forms an auxiliary heater.

11. The air-conditioning system according to claim 10, wherein the heat exchanger is arranged downstream of the at least one cooler with respect to the air flow.

12. The air-conditioning system according to claim 1, wherein one of the at least two separate regions has a different number of electric heating elements than another one of the at least two separate regions.

13. The air-conditioning system according to claim 1, wherein the ducting system includes a third part air flow of the at least two part air flows with an associated duct and an associated air outlet where the associated duct of the third part air flow is provided without any electric heating element.

14. A motor vehicle, comprising an air-conditioning system for air-conditioning a vehicle interior, the air-conditioning system including:
    a blower for generating an air flow,
    at least one heating device through which the air flow can flow for heating the air flow,
    a ducting system that, during operation of the air-conditioning system, divides the air flow downstream of the at least one heating device over at least two part air flows and supplies the at least two part air flows via associated ducts to associated air outlets, through which the part air flows exit into the vehicle interior,
    wherein the at least one heating device comprises at least two separate regions each with at least one electric heating element, wherein each electric heating element is separately controllable via a controller,
    wherein each of the at least two separate regions is permanently assigned to a respective one of the associated ducts of the ducting system, the at least one electric heating element of each of the at least two separate regions being disposed in the ducting system upstream of the respective one of the associated ducts, and
    wherein the ducting system is without a flap downstream of the blower with respect to the air flow.

15. The motor vehicle according to claim 14, wherein the air-conditioning system further includes at least one cooler through which the air flow can flow for cooling the air flow.

16. The motor vehicle according to claim 14, wherein at least one of the associated ducts leads into a foot well of the vehicle interior.

17. The motor vehicle according to claim 14, wherein the at least one electric heating element of the at least two separate regions is a PTC heating element.

18. The motor vehicle according to claim 14, wherein the air-conditioning system further includes a heat exchanger that brings about a main temperature control of the air flow, wherein the at least one electric heating element of the at least two separate regions forms an auxiliary heater.

19. The motor vehicle according to claim 14, wherein at least one of the at least two separate regions in the at least one heating device extends over an entire width or height of the at least one heating device.

20. The motor vehicle according to claim 14, wherein the air-conditioning system further includes an adjuster connected to the control device, the adjuster structured and arranged to adjust a temperature and an air mass flow at a certain air outlet.

* * * * *